United States Patent [19]

Yokoyama et al.

[11] Patent Number: 5,602,944
[45] Date of Patent: Feb. 11, 1997

[54] OBJECT-DETECTING SYSTEM FOR OPTICAL INSTRUMENT

[75] Inventors: Shotaro Yokoyama; Takashi Nishibe, both of Kanagawa, Japan

[73] Assignee: Fuji Electric Co., Ltd., Kanagawa, Japan

[21] Appl. No.: 332,443

[22] Filed: Oct. 31, 1994

Related U.S. Application Data

[63] Continuation of Ser. No. 718,383, Jun. 20, 1991, abandoned.

[30] Foreign Application Priority Data

Jun. 26, 1990 [JP] Japan ................................. 2-167352

[51] Int. Cl.$^6$ .................................................. G06K 9/64
[52] U.S. Cl. ......................... 382/278; 356/390; 396/128
[58] Field of Search ................................. 382/278, 209, 382/276, 225, 212, 216; 356/390, 388; 354/408, 409

[56] References Cited

U.S. PATENT DOCUMENTS

| | | | |
|---|---|---|---|
| 4,367,534 | 1/1983 | Herbst et al. | 364/561 |
| 4,547,864 | 10/1985 | Kawabata | 382/42 |
| 4,552,445 | 11/1985 | Mukai et al. | 354/406 |
| 4,573,784 | 3/1986 | Suzuki | 354/406 |
| 4,606,630 | 8/1986 | Haruki et al. | 356/1 |
| 4,864,117 | 9/1989 | Ishida et al. | 250/201 |
| 4,864,629 | 9/1989 | Deering | 382/42 |
| 4,912,497 | 3/1990 | Nishibe | 354/408 |
| 4,989,864 | 1/1991 | Pedotti | 382/42 |

FOREIGN PATENT DOCUMENTS

| | | |
|---|---|---|
| 3429586 | 2/1985 | Germany . |
| 3824092 | 2/1989 | Germany . |
| 3902503 | 8/1989 | Germany . |
| 60-15506 | 1/1985 | Japan . |
| 61-120001 | 6/1986 | Japan . |
| 2142497 | 1/1985 | United Kingdom . |

OTHER PUBLICATIONS

JP 63–261329, Patent Abstracts of Japan, P–831, Feb. 21, 1989, vol. 13, No. 75.

*Primary Examiner*—Yon J. Couso
*Attorney, Agent, or Firm*—Finnegan, Henderson, Farabow, Garrett & Dunner, L.L.P.

[57] ABSTRACT

An object detecting system for an optical instrument having a pair of image sensors which receive light from objects in the field of view through different optical paths, each image sensor producing a group of image data representing the images of the objects in the field of view. Subgroups are formed from the groups of image data, wherein each subgroup represents image data corresponding to a portion of the field of view, and pairs of subgroups are formed with each pair of subgroups including one subgroup formed from each group of image data and both subgroups in each pair representing the same portion of the field of view. Consecutive overlapping segments of image data from each subgroup in each pair of subgroups are tested for high correlation between corresponding segments of image data from the subgroups of each pair. Clusters of segments of image data with high correlation are distinguished and one of the distinguished clusters is selected on the basis of a predetermined set of criteria.

16 Claims, 7 Drawing Sheets

OBJECT-DETECTING SYSTEM FOR OPTICAL INSTRUMENT

This application is a continuation of application Ser. No. 07/718,383, filed Jun. 20, 1991, now abandoned.

BACKGROUND OF THE INVENTION

1. Field of the Invention

The present invention relates to an object-detecting system for an optical instrument, particularly suitable for detecting a plurality of objects when automatically focusing in a camera.

2. Discussion of the Related Art

In recent years, passive systems for detecting objects have been gaining more interest than active systems as automatic focusing systems for optical instruments such as cameras. Passive systems use natural light or light reflected off an illuminated object while active systems use infrared light. Passive systems are more accurate and consume less electric power than the active systems. Passive systems can be grouped into two broad categories: trigonometrical surveying systems where the distance to the subject is detected on the basis of the external light not coming in through the taking lens, and TTL (Through The Lens) systems where the deviation of the camera from its focused condition is detected on the basis of the light coming in through the taking lens.

Both types of systems have a pair of image sensors incorporated in the optical instrument. Each image sensor receives a group of image data through a different optical path, so that two groups of image data are obtained to detect the aforementioned distance or the deviation from the focused condition on the basis of the positions of the images given by the two groups of image data relative to each other. Although the trigonometrical survey system using an external light is known to one skilled in the art, the principle is described briefly below with reference to FIG. 11.

In the figure, a pair of small lenses 11 and 12 are spaced apart by a base length b and receive the light from an object 0 through two different optical paths L1 and L2 to produce images of the object 0 on a pair of image sensors 13 and 14 at positions P1 and P2. For simplicity, it is assumed that the object 0 is located directly in front of the lens 12 when aimed through a finder. The image position P2 on the image sensor 14 is directly on the optical axis of the lens 12 while the image position P1 on the image sensor 13 deviates from the axis of the lens 13 by s as shown, unless the object 0 is at an infinite distance.

A triangle having a distance x to the object 0 for one side and the base length b perpendicular to the distance x for another side, is analogous to a triangle having a focal length f for one side and a deviation s perpendicular to the focal length f for another side. Thus, there is a relationship x/b=f/s between these two triangles. Of these variables, b and f take constant values and, therefore, the detection of the deviation s enables calculation of the distance x by x=bf/s.

The object 0 is not a point source but is a pattern source having an area. Thus, when detecting the deviation s, as many image data points as there are sensors in the right image sensor 14 are collected as a right group r of image data, and the same number of image data points are collected as a left group 1 of image data from the left image sensor 13. The image data points are collected for different positions, i.e., different values of s. The respective image data in the right group r are compared with the respective image data in the left group 1, one after another. A deviation or a shift s of the image position P1 from the optical axis of the lens 11 is determined on the basis of positions of image data in group 1 where the image data in the left group 1 coincides with that in the right group r.

In practice, the data in the left and right groups 1 and r often do not coincide with each other. Thus, evaluations of the correlation between the two groups are made for all image data groups 1 that can be sampled from the left image sensor 13, so that the shift s is determined on the basis of a sampled position of an image data group 1 indicative of a maximum correlation of all those evaluated. Additionally, it is customary that the position of the taking lens is controlled directly by the shift s rather than calculating the distance x on the basis of the shift s.

In order to detect the distance to the object and the associated deviation of focusing of an optical instrument, it is necessary to detect the object by means of a pair of image sensors. For example in FIG. 11, the image sensor 14 has a field of view with a field angle v with respect to the optical axis of lens 12. When the object 0 is within field v, it can be detected with higher accuracies as increasing amounts of data indicative of the pattern of the object are collected. Thus, the larger the field angle, the more accurately the object is detected. However, practical problems arise in connection with increasing the field of view.

Referring to FIG. 12, when the field of view v1 is large, a plurality of objects, for example 01 and 02, often fall in the field angle, and which object is actually being detected is indefinite, thereby causing an erroneous detection. Conversely, if the field angle is small as depicted by v2, there may be no object in the field of view, thereby causing failure in detecting an object.

Therefore, the field of view should be selected carefully. Conventionally, narrow field angles have often been selected to avoid erroneous detection of an object because if detection failure occurs, the user is informed that the object is not detected, so that the user may again try to detect the object. However, the user loses a good chance of tripping a shutter. The drawback associated with a narrow field angle can be solved by combining the system with a so-called focus lock function. In such a case, the operation becomes more complex and includes two stages. If the optical instrument is moved during the two-stage operation, even though it is a small movement, so-called "hand-shake" may spoil the performance of the instrument.

With the field angle held narrow, an object not on the optical axis of the optical instrument can be detected by using the distance detection technique (Published Unexamined Japanese Patent Application Nos. 60-15506 and 61-120001) in which the distance to the object is measured in an oblique direction. This technique is still not sufficient in that when a plurality of objects are involved, i.e., sufficient data showing which object should be selected may not be obtained.

SUMMARY OF THE INVENTION

The present invention has been made in view of the above circumstances and has as an object to provide an object detection system where wider field angles of an optical instrument are obtained for detecting the object, and a plurality of objects within a field of view are selectively detected.

A further object of the invention is to provide data indicative which object should be selected when a plurality of objects are involved.

Still another object of the invention is to enable the detection of the distance to respective objects within the field of view, or the associated detection of focusing condition.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the object detecting system for an optical instrument having two image sensors that receive light from objects in a field of view through different optical paths, each image sensor producing a group of image data representing the images of objects in the field of view, of the present invention comprises:

subgroup sampling means for forming subgroups of image data from the groups of image data, each of the subgroups representing image data corresponding to a portion of the field of view, and forming pairs of subgroups, wherein each pair of subgroups includes one subgroup formed from each group of image data and both subgroups in each pair of subgroups represent the same portion of the field of view;

correlation testing means for testing consecutive overlapping segments of image data from each subgroup in each pair of subgroups for high correlation between corresponding segments of image data from the subgroups in each pair; and means for distinguishing clusters of the segments of image data with high correlation and selecting one of the distinguished clusters on the basis of a predetermined set of criteria.

BRIEF DESCRIPTION OF THE DRAWINGS

The accompanying drawings, which are incorporated in and constitute a part of this specification illustrate embodiments(s) of the invention and, together with the description, serve to explain the objects, advantages and principles of the invention. In the drawings.

DETAILED DESCRIPTION OF THE PREFERRED EMBODIMENTS

Figure 1:
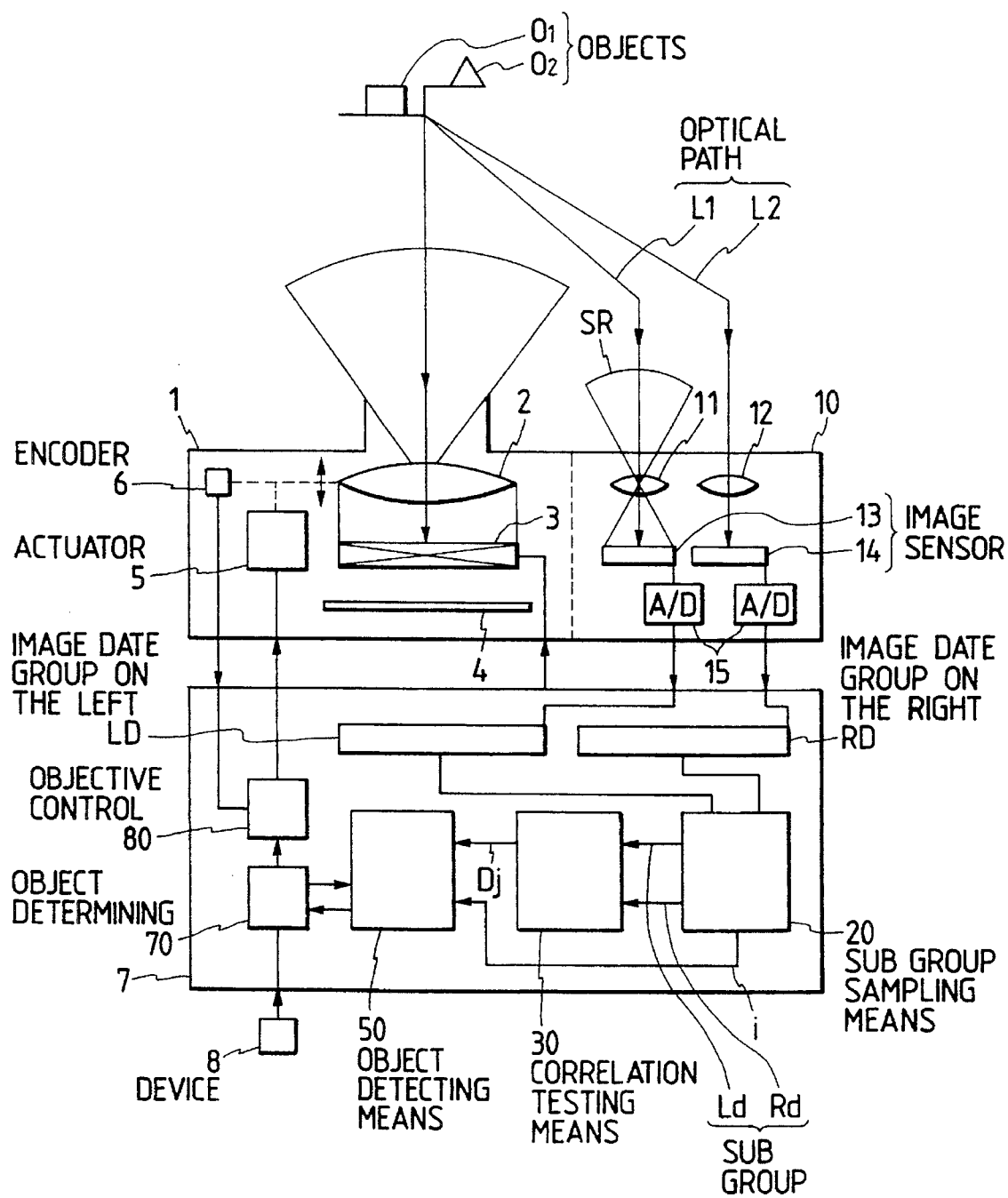
FIG. 1 shows the basic construction of an object detecting system according to the present invention with respect to an auto-focus camera using a trigonometric surveying system.

When one or a plurality of objects within the field of view of an image sensor are detected on the basis of a pair of image-of-object data groups obtained from a pair of image sensors which receive light from the object via different optical paths, the aforementioned objects are achieved by an object detecting system for an optical instrument according to the invention as follows.

A system according to the present invention has a pair of image sensors whose field angles are much wider than conventional systems. Two groups of image data are taken out of the pair of image sensors. The two groups of image data represent the image of the field of view, which contains an object. The object is detected by investigating the contents of the two groups of image data.

First, a subgroup is taken out from each of the two groups of image data. Each subgroup corresponds to image data received from a direction at an angle with respect to the optical axis of the optical instrument. That is, sampling a pair of subgroups implies that only a segment or a fraction of the field angles of the image sensors is sampled. Combinations of one subgroup from each of the two groups of image data are formed by sampling the subgroups of image data consecutively by shifting the segment of the field angle represented by the previous subgroup with respect to the axis of the optical instrument, so that an object is detected for a series of overlapped adjacent segments of the field angle.

Next, the correlation between the subgroups of image data is tested. The respective combinations sampled are tested for correlation of image data between the two subgroups for each consecutive portion of image data, as in the prior art systems. However, unlike the conventional systems, the correlation data for each shift is merely calculated, and the shift that indicates the maximum correlation does not come directly from the test results.

The correlation data for each shift is represented by one-bit of data which indicates whether a local maximum correlation is detected. For example, a value "1" is assigned to the correlation data of a shift which has a local maximum correlation while a value "0" is assigned to the correlation data of a shift which has no local maximum correlation. In conventional systems, only one maximum correlation point is determined. In contrast, the present invention detects local maximum points, and there can be a plurality of local maximum correlation points. The object is then detected on the basis of a collection of correlation data representative of the distribution of such local maximum correlations.

To understand the operation of detecting an object, it is assumed that the aforementioned correlation data are in a region or plane where the shifts used for correlation determination are plotted on one axis of a coordinate system, and the combinatorial numbers of the pairs of subgroups consecutively sampled are plotted on the other axis. The adjacent segments of the field angle for each combination of subgroups are overlapped, and therefore an object in a field angle will also appear in the next field angle unless the object is particularly small.

Thus, in the aforementioned region or plane, if the correlation data shows high correlation for a shift within a certain combinatorial number of subgroups, so does the correlation data that corresponds to the same shift within the next combinatorial number of subgroups. Thus, of the many correlation data plotted in the aforementioned region or plane, a plurality of correlation data that show high correlation with respect to a particular object larger than a predetermined size are concentrated in one place to form a "cluster." An object at which an optical instrument is aimed is detected by detecting such a cluster of correlation data indicating high correlation. One cluster corresponds to one particular object. If there are a plurality of clusters having high correlation within the aforementioned region, a plurality of objects are detected.

As is apparent from the above description, the number of correlation data points showing high correlation within the respective clusters is nearly proportional to the size of a corresponding object. The combinatorial numbers of subgroups which are plotted on one axis of the coordinate system indicate the angular direction of a corresponding object.

The meaning of the shift plotted on the other axis depends on the system designed. When applying the system of the present invention to optical instruments, a trigonometrical surveying system detects the distances to various objects on the basis of the number of shifts that correspond to the respective clusters; while TTL system, where the images of objects are supplied via a taking lens to a pair of image sensors, detects the focus condition of the taking lens with respect to the objects on the basis of the number of shifts that correspond to the respective clusters.

The direction of an object in the field of view of a pair of image sensors is detected from the combinatorial number of subgroups sampled from two groups of image data where the subgroups correspond to the aforementioned clusters. The virtual sizes of the objects are detected from the sizes of the respective clusters. The directions and virtual sizes of objects are used for deciding which object is to be selected if a plurality of objects are detected in the field of view.

When picking up one of a plurality of objects, it is advantageous to provide a setting device adapted to preset or specify the criteria for choosing an object each time the optical instrument becomes operative so that a microcomputer can determine which object to focus on the basis of the aforementioned criteria.

An embodiment of the invention will now be described with reference to drawings. FIG. 1 shows the basic construction of an auto-focus camera using a trigonometrical surveying system to which an object-detecting system according to the invention is applied. In FIG. 1, an optical instrument 1 is a lens shutter type camera which is provided with an objective or taking lens 2, a shutter 3, film 4, actuator 5 for adjusting the position of the objective lens 2, and encoder 6 for detecting the position of the objective lens 2. The optical instrument 1 may be used to photograph one of a plurality of objects $0_1$ and $0_2$, which are usually located at different distances. A module 10 for the trigonometrical surveying incorporated in the optical instrument 1 includes a pair of small lenses 11 and 12, a pair of image sensors 13 and 14, and A/D converters 15 for the image sensors. The lenses 11 and 12 are aimed at the objects $0_1$ and $0_2$ and receive the light from the objects via optical paths L1 and L2, which are different in space so as to produce images of the respective objects on the image sensors 13 and 14.

A processor 7 shown at lower end of FIG. 1 is, for example, an eight-bit microcomputer incorporated in the optical instrument 1. The processor 7 has a RAM which stores image data LD and RD produced by the image sensors 13 and 14 and converted into digital form by the A/D converters 15. Such image data can also be produced by a CCD image sensor, but in this embodiment the image data is preferably produced with a resolution of 4 to 6 bits by the use of a photodiode array for the image sensors.

Figure 7:
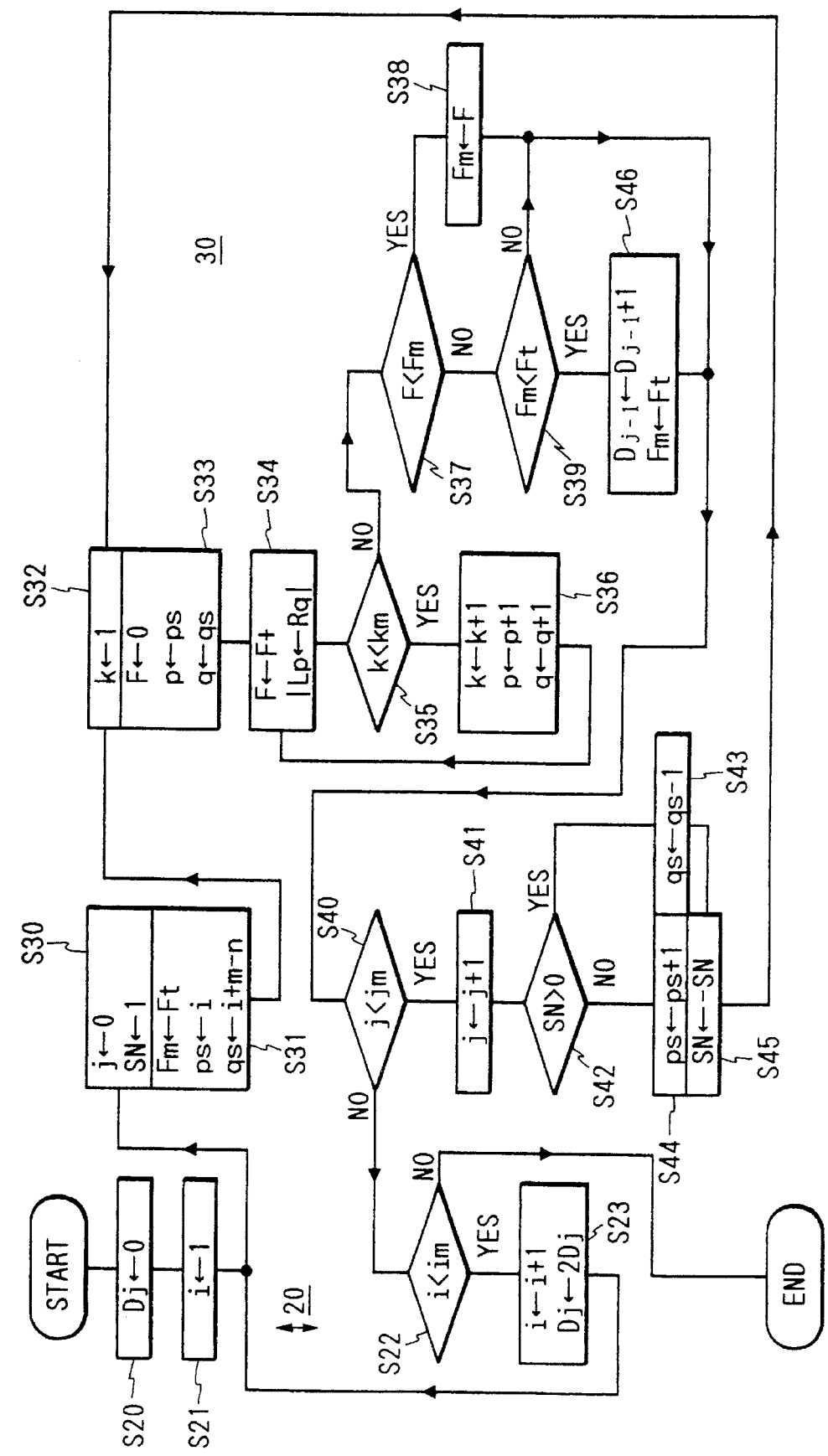
FIG. 7 is a flowchart exemplifying the operations of sampling a subgroup and testing the correlation data.
Figure 8:
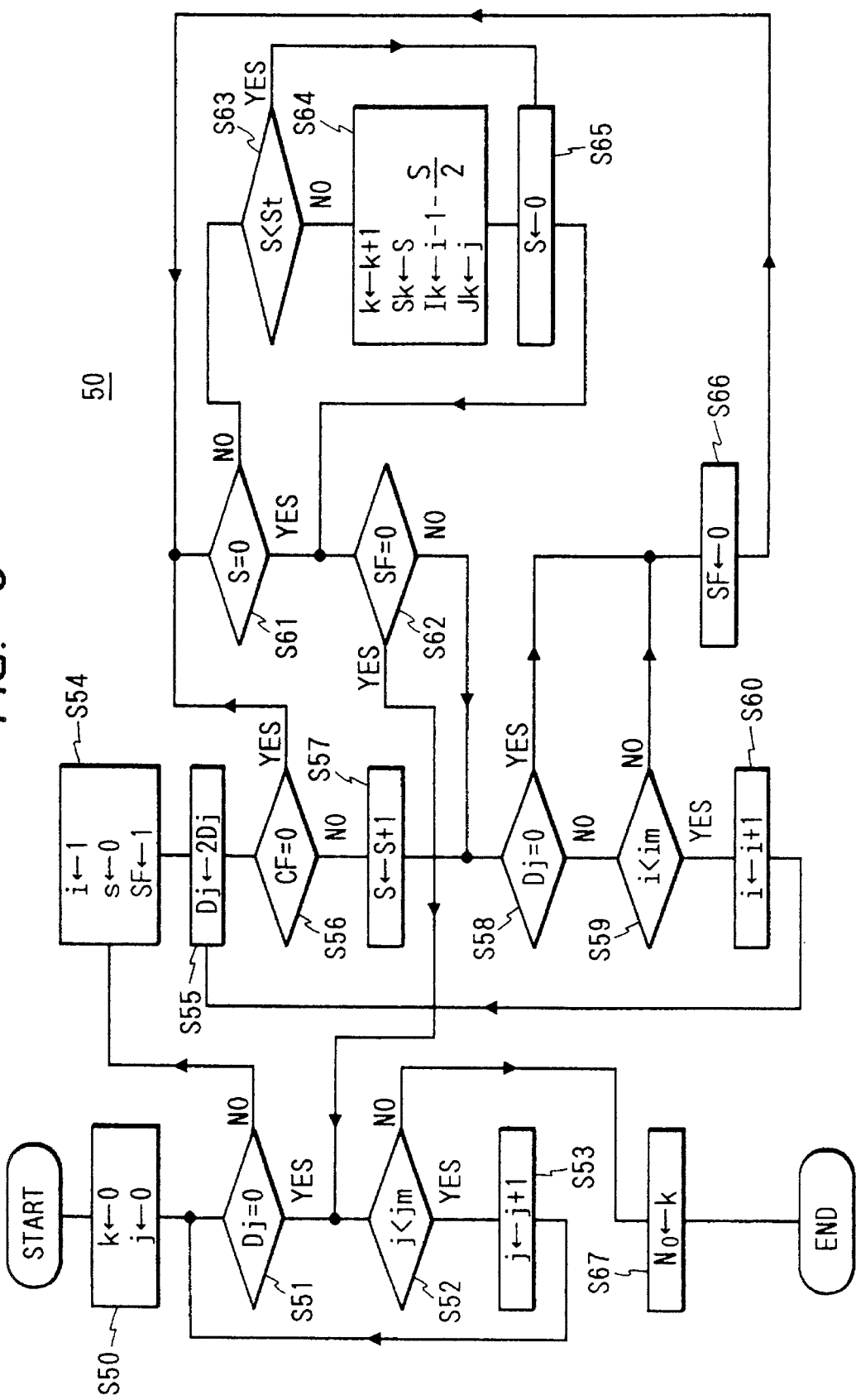
FIG. 8 is a flowchart exemplifying the operation of testing the objects.

The processor 7 has therein a subgroup sampling means 20, correlation-testing means 30, and object detecting means 50 which are elements of the invention. The processor 7 also has an object determining means 70 and objective control means 80 which are associated with the system according to the invention. All of the above-described means may be implemented by software to be executed by the processor 7. In addition, a setting device 8 is provided so as to output various settings associated with the operation of the object determining means 70. The basic functions of the aforementioned three means as shown in FIGS. 7 and 8, will first be described with reference to FIGS. 2–6.

Figure 2:
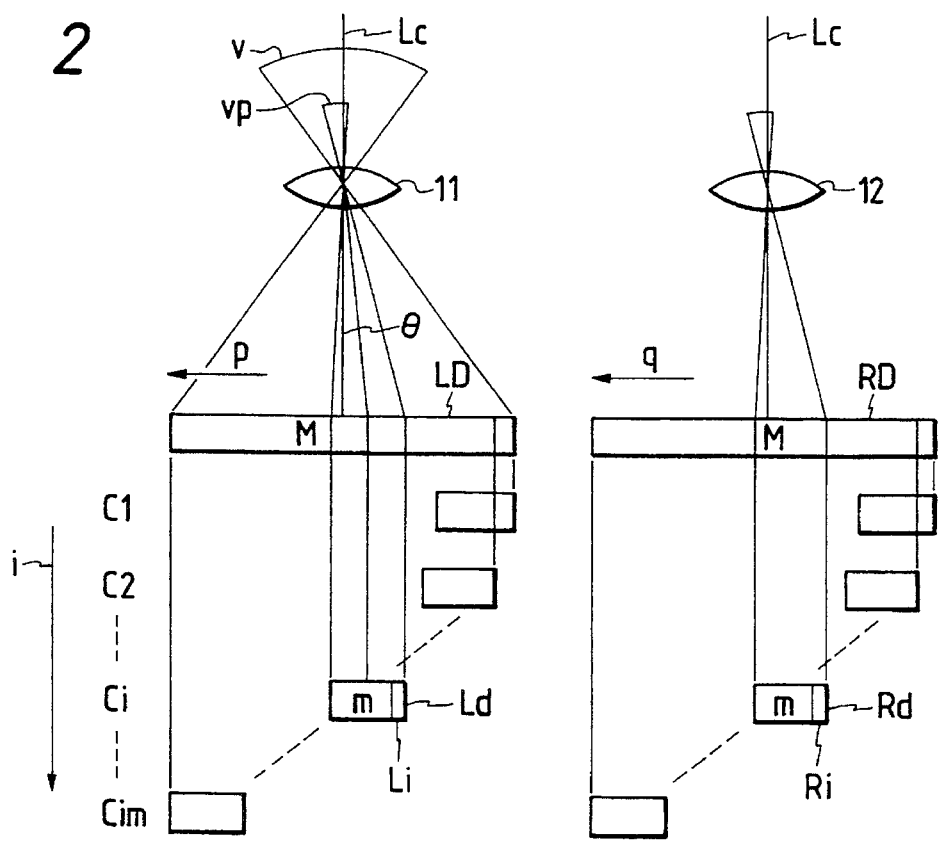
FIG. 2 is an illustrative diagram showing the function of sampling subgroups.

FIG. 2 illustrates the operation of the subgroup sampling means 20, and for convenience a pair of small lenses 11 and 12 are shown at an upper area of FIG. 2 and below the lenses 11 and 12 a pair of image data groups LD and RD are shown in place of the image sensors. M sensors, where M is more than 100, are preferably used so as to provide M points of data for image data groups LD and RD, which represent image patterns, including objects, within a field angle considerably wider than that of conventional systems. For convenience of description, the image data in the image data groups LD and RD are represented by Lp and Rq, where p and q are integers beginning from 1.

The subgroup sampling means consecutively samples the subgroups Ld and Rd, shown at the bottom of the figure, from the image data groups LD and RD. The number m of image data in each subgroup is, for example, 24, about ¼ to ⅕ of the number M of the total image data. It turns out that the subgroups Ld and Rd represent an image pattern in an field angle vp considerably more narrow than the field angle v for the image data groups LD and RD. Likewise, the subgroup sampling means samples the subgroups Ld and Rd from the image data groups LD and RD one after another by shifting or advancing the image data point by one each time.

For convenience, the i th combination of the left subgroup Ld and the right subgroup Rd is identified as Ci using a variable i beginning from 1 as shown on the left end of FIG. 2. As is apparent, the maximum value im of the variable i is M−m+1. In FIG. 2, a middle image data point in the left subgroup Li is at an angle θ with respect to the optical axis Lc of the optical instrument. The segment vp of the field angle has a specific angle with respect to the optical axis Lc for the combinatorial number 1 of a pair of subgroups.

Figure 3:
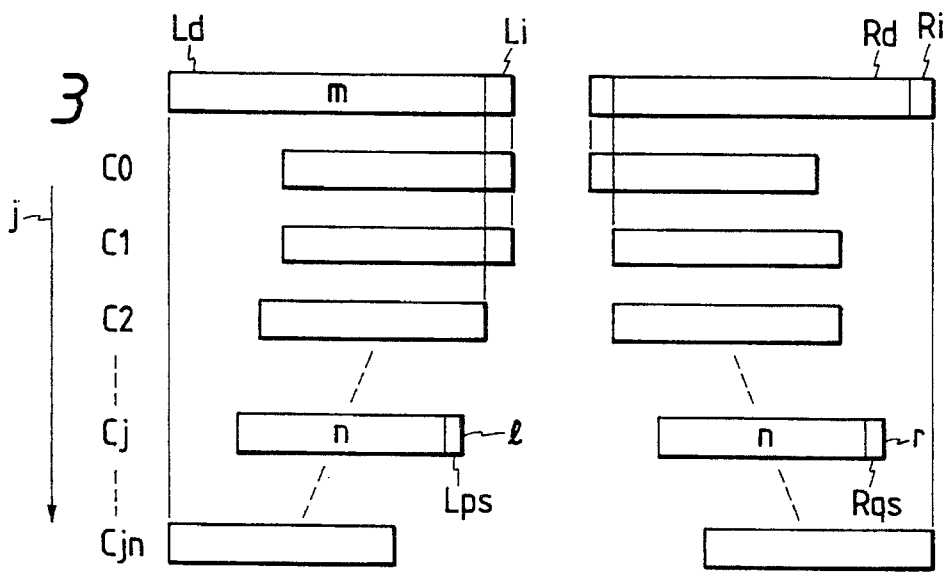
FIG. 3 is an illustrative diagram of subgroups and small subgroups by which the functions of the correlation testing means are exemplified.

FIG. 3 shows the outline of correlation testing performed by the correlation testing means 30 for a pair of subgroups Ld and Rd sampled as described above. In this outline of testing, small subgroups 1 and r each including n image data points are sampled in turn from the subgroups Ld and Rd, each of which include m image data points, so that the small subgroups 1 and r are each sampled in opposite directions toward the ends of the subgroup, Ld and Rd, by shifting by one image data point each time. Then, the correlation between the small subgroups 1 and r is tested each time they are sampled.

An evaluation function used for correlation testing can be obtained by adding up the absolute values of all of the differences between corresponding image data points in the respective pairs of left and right small subgroups each having n image data. If all the corresponding image data coincide with each other, then the value of the evaluation function is 0, but the function usually takes a certain value. This value is referred to as a correlation data point. FIG. 3 shows, on the left, combinations of the small subgroups 1 and r depicted by Cj where j begins from 0 and the maximum value jm thereof is 2(m−n). The number n of image data in a small subgroup is selected to be, for example 16, about ⅔ of the number m of image data in a subgroup.

A pair of small subgroups of the first combination CO are sampled such that one small segment is sampled from the rightmost small subgroup in the subgroup Ld and the other segment from the leftmost small subgroup in the subgroup Rd. The image sensors 13 and 14 are positioned with respect to the small lenses 11 and 12 in the left and right direction such that the first combination CO shows a high correlation if the object which corresponds to the subgroups Ld and Rd in the angle of field vp in FIG. 2 is infinitely distant.

As the object becomes closer to the lens from infinity, the image of the object moves leftward in the left subgroup Ld and rightward in the right subgroup Rd. Therefore, the combination that shows a high correlation moves downward in FIG. 2. In order to follow the high correlation, the above-described Cj is produced by sampling the small subgroups 1 and r from the subgroups Ld and Rd, respectively, by shifting by one image data point each time. The variable j indicates the number of shifts. When j=0, the combination Cj is C0.

Figure 4:
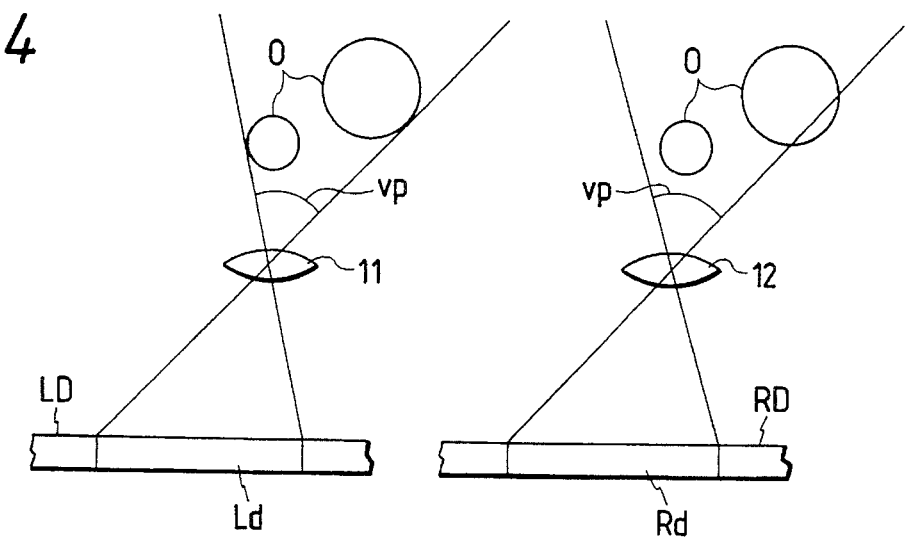
FIG. 4 shows the positional relation between objects and subgroups in image sensors associated with the operation of testing the correlation data.
Figure 5:
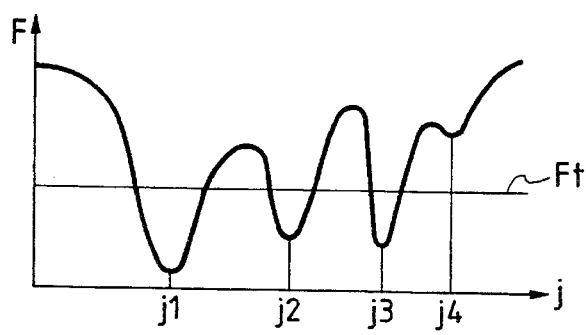
FIG. 5 shows a distribution of correlation data that corresponds to the example of operation of testing the correlation data shown in FIG. 4.

FIGS. 4 and 5 show the operation of such a correlation testing means. As shown in FIG. 4, there are usually a plurality of objects in the field angle vp which correspond to the subgroups Ld and Rd. The result of testing correlation for different values of j through the procedure shown in FIG. 3 will be that shown in FIG. 5 where the correlation data F has a plurality of peaks and valleys. Since the values of j on the abscissa vary in step, the correlation data F on the ordinate actually vary in steps. The plot in FIG. 5 has been drawn in a smoothly varying curve for ease of observation. The lower the correlation data in FIG. 5, the higher the correlation is. In the figure, the correlation is maximum at points j1 to j4 where the correlation data F is minimum. While the testing means only has to calculate the correlation data F such as that shown in FIG. 5, it is assumed that a one-bit correlation data point having a "1" for shifts at j1, j2, and j3 where the correlation reaches local minima below a predetermined threshold level Ft, and a "0" for all other shift values.

Figure 6:
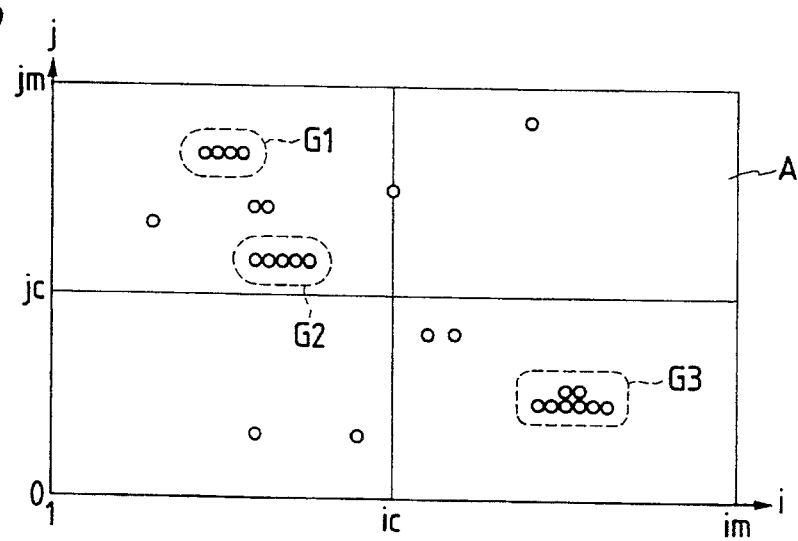
FIG. 6 shows the distribution of correlation data used in describing the function of detecting objects.

FIG. 6 illustrates the operation of the object detecting means 50 associated with the above-described correlation data. The abscissa indicates the combinatorial number i of pairs of subgroups sampled by the subgroup sampling means 20 and the ordinate indicates the shift values j used by the correlation testing means 30. The correlation data are plotted in an area A. If the correlation data are in a multi-bit form, then the correlation data are plotted in a three dimensional curvature. In this example, the correlation data are of one-bit form and are plotted with small circles, each small circle indicating a local maximum value of correlation. Distributed in FIG. 6 are a considerable number of local maximum correlation points, i.e., objects in the field angle of the image sensor. As mentioned above, objects greater than a predetermined size give maximum correlation for adjacent field angles, i.e., two pairs of subgroups of adjacent values of j. Thus, making use of such local-maximum correlation, clusters of local maximum correlation points such as G1 to G3 are detected. When the correlation data is of one-bit structure which represents only local maximum points of correlation, the local maximum points in clusters G1–G3 line up in the direction of i. When the correlation data is similar to the evaluation function, the points indicating high correlation are distributed in two-dimensions.

The specific operation of a system according to the present invention will now be described with reference to the flowcharts in FIGS. 7 and 8. FIG. 7 illustrates the operation of sampling the subgroups and testing for correlation. FIG. 8 illustrates the operation of detecting the objects. The left row in FIG. 7 shows the operation of sampling the subgroups. At step 20, the data $D_j$ are reset to 0 where the aforementioned one-bit correlation data for all the values of the variable i are collected for each value of the variable j. The data $D_j$ is 9–15 bytes long. At step 21, "1" is assigned to the combinatorial number i of the pair of subgroups to specify the first combination C1 shown in FIG. 2.

At step 30, "0" is assigned to the variable j to specify the first combination CO of a pair of small subgroups and "1" is assigned to a sign variable SN. Step 31 is a step for the initial set up of correlation testing where a threshold value Ft in FIG. 5 is loaded into a minimum-value variable Fm of the evaluation F derived from the evaluation function from which the correlation data is obtained. Then, i is assigned to the image data number ps at the top of small subgroup 1, and i+m−n to the image data number qs at the top of small subgroup r. It should be noted that these values of ps and qs are the image data at the top that correspond to the first combination CO.

Then, at step 32, "1" is assigned to a number-of-data variable k, and at step 33, "0" is assigned to the evaluation variable F, and the image data numbers p and q are inputted into the top image data numbers ps and qs, respectively. Step 34 is for calculating the correlation where the evaluation variable F is added the absolute value of the difference between the image data Lp of the small subgroup 1 and the image data Lq of the small subgroup r. At step 35, a decision is made based on whether or not the number-of-data variable k is smaller than its maximum value km or the number n of image data. If the answer is YES, then the number-of-data variable k and the numbers p and q of image data are incremented by "1" and the flowchart returns to step 34 for reiterating the same operation. When the number-of-data variable k reaches its maximum value km, the calculation of one evaluation F is complete.

The program proceeds from step 35 to step 37 where a decision is made based on whether or not the evaluation F is smaller than the minimum value Fm. If the answer is YES, then the minimum value variable Fm is assigned the evaluation F at step 38; if NO, then a decision is made based on whether or not the minimum value variable Fm at that time is smaller than the previously mentioned threshold value Ft. During early stages of the program, the decision is NO. Thus, the program proceeds from step 39 or step 38 to step 40 where the value of variable j is compared with its maximum value jm. During early stages of the program, the answer is YES, and the program proceeds to step 41 where the variable j is incremented. At step 42, the sign variable SN is examined whether or not it is positive or negative. If the SN is positive, then the top image data number qs of the small subgroup r is decremented by "1" at step 43; if the SN is negative, then the top image data number ps of the small subgroup 1 is incremented by one. In any case, the sign of variable SN is reversed at step 45.

Thereafter, the program returns to step 32 where the evaluation F is calculated for the next combination of the small subgroup. The evaluation F is calculated for each value of the variable j incremented in the manner shown in FIG. 3, and Fm is replaced by a new evaluation F whenever an evaluation F is smaller than the current maximum variable Fm. If the evaluation F is greater than Fm, a decision is made based on whether the minimum value variable Fm at that time is smaller than the threshold value Ft. The program proceeds to step 46 only when the answer is YES. If the answer is YES at step 39, the previously calculated and stored minimum value variable Fm indicates the local maximum correlation to be determined in this embodiment. Thus, at step 46, $D_{j-1}$ corresponding to the previous value is incremented by "1" for one-bit correlation data and the minimum value variable Fm is reset to the threshold value Ft, and then the program returns to step 40.

Thereafter, when the operation of calculation for all values of the variable j is completed for a value of the variable i in FIG. 6, the program jumps from step 40 to step 22. At step 22, a decision is made based on whether or not the variable i is less than its maximum value im; if the answer is YES, the variable i is incremented at step 23, the data $D_j$ is doubled for all the values of the variable j, and the aforementioned one-bit correlation data is stored for the incremented variable i. Then, the program jumps to step 30 and thereafter the same procedures are repeated. After the operation has been completed for all the values of the variable i, the program exits from step 22 to complete the entire operation of FIG. 7.

Thus, the calculation of correlation data has been completed. The operation of detecting the object will now be described with reference to FIG. 8 whose operation corresponds to FIG. 6. At step 50, the object number k, different from k in FIG. 7, is assigned "0" and the variable j is set to 0. At step 51, a decision is made based on whether or not the data $D_j$ corresponding to the variable j is 0; if it is 0, the program proceeds to step 52 to make a decision whether or not the variable j has reached its maximum value jm. If the variable j has not reached its maximum value, then the variable j is incremented and the program returns to step 51 to search for a data $D_j$ which is not 0. When a non-zero data $D_j$ is found, the program returns from step 51 to the initial step 54 in order to search for a cluster.

In step 54, the variable i is reset to 1, the size variable S of the cluster is reset to 0, and flow-selection flag SF is set to 1. In step 55, the data $D_j$ is doubled to cause the most significant bit to overflow. If the most significant bit is 1, then a carry CF is output. At step 56, a decision is made whether or not the carry CF is 0.

If the decision at step 56 is NO, that is, the carry CF is outputted, the program enters step 57 to add "1" to the size variable S, and if the data $D_j$ is not empty at step 58 as well as if the variable has not reached its maximum value im, then the variable i is incremented at step 60 and returns to step 55 to search for "1" contained in the data $D_j$. If the answer is YES at step 56, then at step 61 a decision is made based on whether or not the size variable S is still 0. If the answer is YES at step 61, then at step 62 a decision is made based on whether or not the selection flag SF is 0. Since the selection flag SF is "1", the program proceeds to step 58. If the size variable S is not 0, then at step 63 a decision is made based on whether or not the size variable S is smaller than a predetermined threshold value St. If YES, then the size variable S is reset to 0 at step 65, and the program proceeds to step 62, and if NO, i.e., the size variable S indicates a cluster greater than the predetermined threshold value St, the program goes through step 64 to store the clusters and then proceeds to step 65.

At step 64, the object number k is incrementally "1" and the value of the variable S is stored in the cluster size Sk corresponding to k, the value of i−1−S/2 is set into Ik to indicate the position of the middle variable in the direction of i, and j is set into Jk to indicate a position of the cluster in the direction of the variable j.

Thereafter, the program goes through steps 65 and 62 to step 58 where a decision is made based on whether or not the data $D_j$ is equal to 0. If the data $D_j$ is 0, then the program proceeds from step 58 to step 66, and if the operation has been completed for all values of the variable i the program proceeds from step 59 to step 66. At step 66, the selection flag SF is set to 0 and then the program proceeds to step 61. An operation similar to that mentioned above will again be performed. Since the selection flag SF is 0, the program takes the path from step 61 as well as from step 65 to step 52 through step 62, where the operation is carried out for the next value of the variable j.

When the aforementioned operation has been completed for all values of the variable j and the value of j has reached its maximum jm, the program proceeds from step 52 to step 67 where the value of the number-of-objects k is stored as the number of detected objects, and the program is then over.

Figure 9:
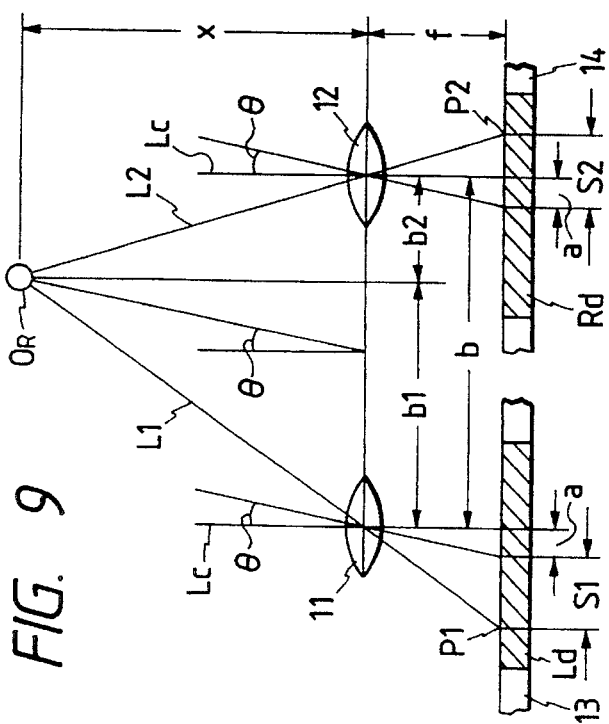
FIG. 9 shows the positional relation between objects and subgroups in image sensors associated with the operation of an auto-focus camera to which the trigonometrical surveying system according to the invention is applied.

The operation of a system according to the invention has been described. The significance of the shift value Jk which is a previously mentioned coordinate indicative of the position of objects, will be described with reference to FIG. 9 and 10. FIG. 9 shows the relative positions between the lenses 11 and 12 and the image sensors 13 and 14 for one $O_R$ of detected objects in the trigonometrical surveying system. The positions of the subgroups Ld and Rd are shown hatched on the left and right image sensors, respectively, with the subgroups exaggerated in the horizontal direction. The subgroups Ld and Rd receive an object within field angle of θO, which is an angle that a line passing through both the center of the lens and the center of the subgroup makes with respect to the optical axis of the lens. The images of the object are centered at P1 spaced apart by s1 from the center of the subgroup Ld, and at P2 separated by a distance of s2 from Rd. The distance between the center of subgroup Ld and the optical axis of the lens 11 and the distance between the subgroup Rd and the optical axis of the lens L12 is a, and the base length b between the two lenses is divided into b1 and b2 by a line from the object and perpendicular to the base length.

With reference to the left half of FIG. 9, a triangle having the distance x to the object $O_R$ perpendicular to the segment b1 of the base length b, is analogous to a triangle having the focal length f of the lens 11 and a distance s1+a to the center of the lens 11. Thus, the following relationship exists.

$$b1/x=(s1+a)/f$$

Likewise, for the right half of the figure $$b2/x=(s2-a)/f$$

and then the following relationship is obtained.

$$b/x = s/f$$

Figure 11:
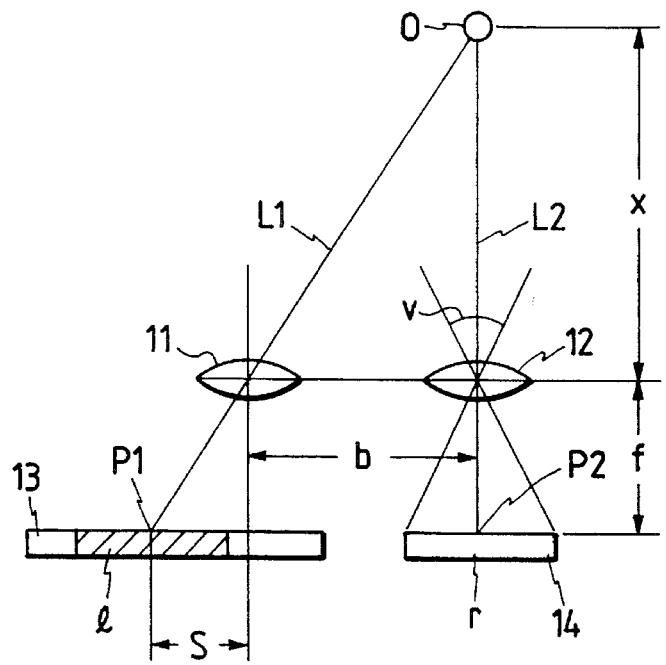
FIG. 11 shows the principle of operation of a prior art trigonometrical surveying system.
Figure 12:
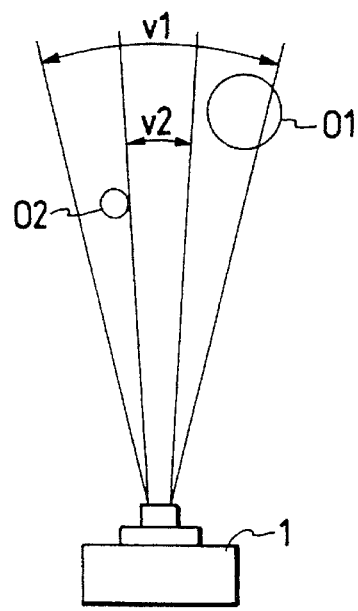
FIG. 12 shows the positional relation between the object and the optical instrument, illustrating the problems associated with the prior art systems.

This is the same equation as obtained with respect to FIG. 11 and reveals that the principle of the trigonometrical surveying is also true of the pairs of subgroups. The sum s of the amount of left-shift and right-shift is proportional to the shift value Jk or the aforementioned coordinate corresponding to the object $O_R$ in FIG. 9, which coordinate is obtained by shifting image data in a pair of subgroups in accordance with the procedure shown in FIG. 3. In this manner, the distance x to the object $O_R$ can be detected from the shift value Jk corresponding to the distance x.

Figure 10:
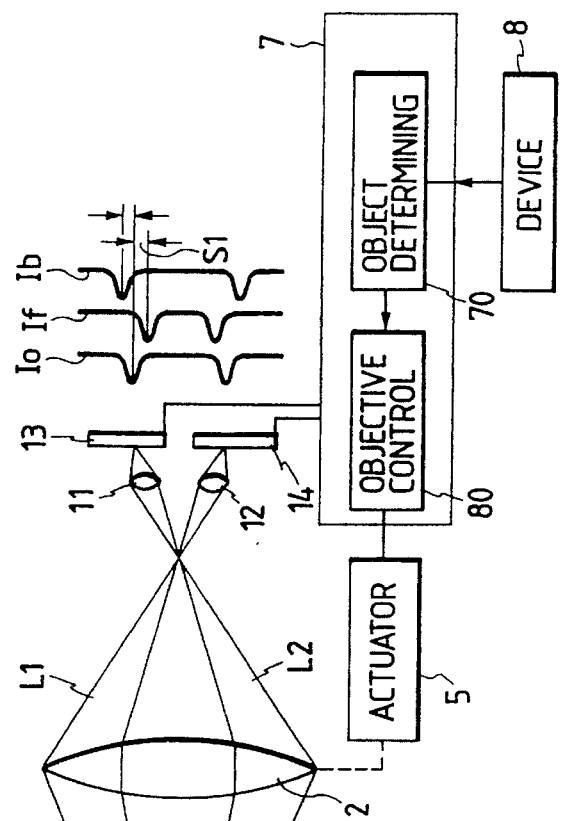
FIG. 10 represents the general construction of an auto-focus camera to which the TTL system according to the invention is applied.

FIG. 10 shows a TTL system. As is well known, in the TTL system, the light from the object 0 is incident upon the small lenses 11 and 12 via the light paths L1 and L2 passing through two different parts in the lens 2, and produces images on the image sensors 13 and 14. A film is positioned behind the taking lens 2, and therefore, the light rays incident on the lenses 11 and 12 are changed in direction, but for convenience of description the light is drawn to travel in a straight path.

FIG. 10 shows three images on the right end thereof, each of which are images of the object 0 received by the image sensors 13 and 14. An image Io is an image exactly focused, an image If is an image produced in front of the true focal point, and an image Ib is produced behind the true focal point. The system according to the invention detects the shift s1 of the images If and Ib relative to the exactly focused image Io, the shift s1 being in the form of the previously described shift value j or Jk proportional to the shift s1. It should be noted that in the TTL system the sum of shifts is s−2s1 since the shifts of the two images on the image sensors are equal.

Comparing the TTL system in FIG. 10 with the trigonometrical surveying system in FIG. 11 shows that when the object is infinitely far, the shift s in the trigonometrical surveying system is 0 and varies only in the positive direction as the object becomes closer while the shift s in the TTL system varies both in the positive and negative directions. Thus, the TTL system differs from the trigonometrical surveying system in that the Shift j has a slightly different meaning. That is, the image sensors 13 and 14 are positioned relative to the lenses 11 and 12 in FIG. 10 such that the image is exactly focused at the center jc of variation range 0 to jm of the variable or shift value j. The TTL system differs from the trigonometrical surveying system only in this respect. The direction of the angle θ of a segment vp of field angle within which an object is to be detected, is shifted by sequentially sampling the pair of subgroups in accordance with the procedure in FIG. 2 just as in the trigonometrical surveying system.

Thus, in both the systems, the direction of the angle θ can be varied in accordance with the value of the variable i which is a combinatorial number of a subgroup pair. Of course, the angle θ can be varied both in positive and negative direction, for example, in FIG. 6, the angle θ is set such that the center ic of variation range "1" to im of the variable i is located directly in front of the object 0.

Finally, the application of the trigonometrical surveying system and TTL system according to the invention to the auto-focus cameras will be described.

With the optical instrument 1 of the trigonometrical surveying system in FIG. 1, it is assumed that three objects are detected corresponding to clusters G1 to G3 as shown in FIG. 6 through symmetrical detection according to the invention. In this case, of course, which of the objects is selected depends on how the optical instrument is used. For example, the object may be selected according to the following settings.

(a) Selection of an object closest to the front of the optical instrument.

The object corresponding to the cluster G2 closest to the center 1c of the variable 1 in FIG. 6 is selected.

(b) Selection of an object closest to the instrument.

The variable j grows larger with decreasing distance. In this case, the object corresponding to the cluster G1 is selected.

(c) Selection of an object whose virtual size is the largest.

The object corresponding to the cluster G3 having the largest size is selected.

The aforementioned list of settings to select objects is only exemplary and may be determined appropriately according to the manner in which the optical instrument is used.

An object selecting means 70 in FIG. 1 may be implemented as software loaded into the processor 7 so as to select an object to be focused on in the aforementioned manner while a setting device 8 is to set a two-bit or three-bit code to specify one of the aforementioned settings. The object selecting means 70 receives a coded command that specifies the selection settings outputted from the setting device 8, and on the basis of these settings the object selecting means 70 reads out the cluster size Sk and the position coordinate Ik and Jk of a cluster stored in the object detecting means 50. The software for any of the aforementioned selection settings can be very simple.

In the trigonometrical surveying system, the aforementioned shift value Jk corresponding to the distance to the object selected by the object selecting means 70 is supplied to the objective controlling means 80. The objective controlling means 80 controls an actuator 5 on the basis of the shift value Jk so as to align the position of the objective or taking lens 2 read from an encoder 6. The settings of the setting device 8 can be fixed to the optical instrument or can be adapted to be set for individual photographings.

For auto-focus cameras of the TTL system shown in FIG. 10, the settings to be assigned to the object selecting means 70 include selection of the most sharply focused object, selection of an object closest to the front of the instrument, and selection of an object whose virtual size is the largest. For selection of the most sharply focused object, since the variable j in FIG. 6 indicates the shift from the focused condition, the cluster G2, close to jc where an object is exactly focused, is selected.

The object selecting means 70 receives one of the selection settings from the setting device 8 so as to select an object based on the setting, and supplies the objective controlling means 80 with a signal representative of the difference between the shift value Jh corresponding to the selected object and the central shift value jc corresponding to the focused condition or simply a signal indicative of positive or negative polarity. The objective controlling means 80 controls by means of the actuator 5 the position of the taking lens 2 in the direction indicated by the signal or in the direction and at the speed indicated by the signal, and continues to control until the signal from the object selecting means 70 indicates a predetermined allowable value. Thus, the TTL system is usually of a closed loop control in nature.

The above-described embodiment is only exemplary and modifications may be made in various forms. The correlation data produced by the correlation testing means is not limited to the aforementioned one-bit data and can be evaluation values as calculated with an evaluation function of the correlation testing means. In such a case, the operation of the object detecting means is somewhat complicated but is capable of accurately detecting an object from a two-dimensional cluster having correlation indicative of a high correlation. Properties useful for the object selecting means can be detected in addition to the cluster size and the coordinate of the center of the cluster.

Although the embodiment is arranged such that the optical axes of the lens 11 and 12 are in line with the center of the image sensors 13 and 14 as shown in FIG. 1, it is advantageous that they deviate from each other.

The control of the position of the taking lens is usually of a closed loop control when the invention is applied to a TTL type auto-focus camera. Thus, to increase the closed loop control speed, it is advantageous that the operation ranges of the subgroup sampling means and correlation testing means are limited only to the variables i and j corresponding to clusters close to the object.

In the present invention, when objects within the field of view of image sensors are detected on the basis of a pair of image-of-object data groups obtained from a pair of image sensors that receive the light from the object, subgroups are taken out from image data groups to make a combination of the subgroups that correspond to an object in a direction at an angle with respect to the optical axis of the optical instrument. The combination of subgroups is made for different angles, and the combination of subgroups are sampled consecutively. Testing is consecutively made on the correlation of respective image data between subgroups in each of the combinations, the correlation being tested for each of consecutive small segments in each subgroup that is obtained by shifting the image data within the subgroup in the opposite directions. Clusters of correlation data having a high correlation are picked up as an object. The clusters are from the collection of data that are aligned in the order of the shift for each of the combination of subgroups aligned in order.

The present invention is advantageous in the following respects.

(a) A pair of subgroups is sampled from a pair of image data groups of an object in a direction at an angle with respect to the optical axis of the optical instrument. The aforementioned angle is then sequentially varied to sample the pair of subgroups to search for objects within a narrow field angle that corresponds to the subgroup. This is to effectively expand the field angle in which the optical instrument detects objects, so that the objects are not overlooked as in the conventional systems.

(b) Even if a plurality of objects exist within the field of view, and some are farther from the optical instrument than the others, these objects are clearly distinguished one from the others by the object detecting means on the basis of the correlation data produced by the correlation testing means.

(c) The properties such as the virtual size and direction of the angle of field are available for each object detected by the object detecting means. Thus, even if a plurality of objects are detected within a field of view, a desired object can be distinguished from the others with a clearly defined setting. The setting can be easily specified in accordance with the usage of the optical instrument and conditions of the field of view.

(d) When the present invention is applied to the detection of distances in the trigonometrical surveying system and to the detection of the deviation from an exactly focused condition in the TTL system, the respective means of the invention can be applied. Therefore, it is only necessary to adjust the involved system with respect to the manner in which a desired object is picked up from detected objects. Thus, for example, by simply modifying with a setting device the manner in which an object is identified, the present invention may be applied to both the systems.

(e) Malfunctions encountered to some extent with conventional systems are substantially eliminated. For example, if two objects 0 exist within a field angle vp as shown in FIG. 4, the local minimum points of evaluated value are supposed to appear only at shifts j1 and j3 in FIG. 5. However, if the distances to the two objects are different, especially if they are very close to each other within the field of view, or if the object is in the background and is difficult to distinguish, then a false local minimum may appear accidentally in the evaluated value F at the shift j2, and a small false local minimum point may appear at the shift j4.

Of these false local minimum points, the local minimum point at j4 can be eliminated if a threshold Ft is set as shown. However, the local minimum at j2 may be accidentally smaller than those at j1 and j3, and thus there is a possibility that the local minimum point at j2 is falsely recognized as an object causing an erroneous focusing. In the present invention, the evaluation values in FIG. 5 are calculated by changing the position at which subgroups Ld and Rd are sampled from the image data LD and RD in FIG. 4. Each time the position of sampling image data is changed, the angle in which the object is aimed varies. Changing the angle, no matter how small the angle may be, can reduce the probability that false local minimum points appear at the same place. For example, in FIG. 6, even if a small circle exhibits a false local minimum correlation by accident, there is less probability that the false local minimum occurs repeatedly in the direction of variable i. Two small circles may appear in succession but more small circles are not practical. Thus, setting the threshold Ft to, for example, about four will almost completely eliminate the possibility of erroneous focusing resulting from false maximum correlation.

According to the present invention, an object detecting system can be achieved where objects can be detected without failure, a plurality of objects can be clearly distinguished one from the others, and the possibility of erroneous focusing is eliminated. The system of the invention can be applied primarily to optical instruments such as auto-focus cameras to enhance their operation reliability.

What is claimed:

1. An object detecting system for an optical instrument having two image sensors that receive light from objects in a field of view through different optical paths, each image sensor producing a group of total image data representing images of the objects in the field of view, comprising:

subgroup sampling means for forming a plurality of paired subgroups of image data from each of said groups of total image data as an inclination angle of an associated portion of the field of view is changed as a variable, each of said plurality of paired subgroups of image data corresponding to a portion of the field of view, said paired subgroup of image data having different inclination angles with respect to an optical axis of said optical instrument;

correlation testing means for obtaining correlation data between both subgroups in each of said paired subgroups of image data as an amount of shifting of image data in the paired subgroups is changed as a variable; and means for distinguishing clusters of local maximum correlation points on the basis of a predetermined set of criteria, each point is associated with said amount of shifting of image data which corresponds to a maximum correlation in its paired subgroup and also associated with said inclination angles of its paired subgroup.

2. An object detecting system according to claim 1, wherein the subgroup sampling means, the correlation testing means, and the distinguishing means comprise a programmed processor.

3. An object detecting system according to claim 1, wherein said clusters represent objects in the field of view.

4. An object detecting system according to claim 3, wherein said predetermined set of criteria includes a size of an object.

5. An object detecting system according to claim 3, wherein said predetermined set of criteria includes the distance from the optical instrument to an object.

6. An object detecting system according to claim 3, wherein said predetermined set of criteria includes the distance from the optical axis of a taking lens to an object.

7. An object detecting system according to claim 1, wherein the correlation testing means collects correlation data, representing a degree of correlation between segments of image data, for corresponding segments of image data in each pair of subgroups.

8. An object detecting system according to claim 7, wherein said correlation data is in the form of one-bit data, representing whether the degree of correlation exceeds a threshold amount.

9. An object detecting system according to claim 1, wherein the image sensors are photodiode arrays.

10. A method of detecting an object for an optical instrument having two image sensors that receive light from objects in a field of view through different optical paths, each image sensor producing a group of image data representing images of the objects in the field of view, comprising the steps of:

forming a plurality of paired subgroups of image data from each of said groups of image data as an inclination angle of a portion of the field of view is changed as a variable, each of said paired subgroups corresponding to a portion of the field of view having a different inclination angle with respect to an optical axis of said optical instrument;

obtaining correlation data between both of said paired subgroups of image data as an amount of shifting of image data in the paired subgroups is changed as variables; and identifying clusters of local maximum correlation points on the basis of a predetermined set of criteria, each point is associated with said amount of shifting of image data which corresponds to a maximum correlation in its paired subgroup and also associated with said inclination angles of its paired subgroup.

11. An object detecting system according to claim 1, wherein the distance to the object represented by said selected cluster is detected on the basis of where said selected cluster is in an order in which high correlation clusters are obtained.

12. An object detecting system according to claim 1, wherein said two image sensors receive the image of an object through a taking lens, and the taking lens is focused with respect to a selected object on the basis of where said selected cluster is in an order in which high correlation clusters are obtained.

13. An object detecting system according to claim 1, wherein said predetermined set of criteria includes a size of an object.

14. An object detecting system according to claim 1, wherein said predetermined set of criteria includes the distance from the optical instrument to an object.

15. An object detecting system according to claim 1, wherein said predetermined set of criteria includes the distance from the optical axis of a taking lens of the optical instrument to an object.

16. An object detecting system according to claim 1, wherein said correlation data is in the form of one-bit data.

* * * * *